Feb. 3, 1953     H. I. BECKER     2,627,443
AIR BEARING
Filed Feb. 10, 1950
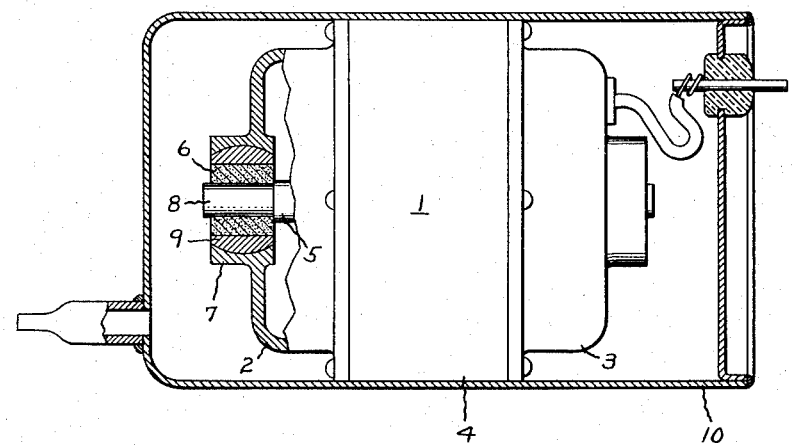
Inventor
Howard I. Becker
by
His Attorney Patented Feb. 3, 1953

2,627,443

UNITED STATES PATENT OFFICE 2,627,443

AIR BEARING

Howard I. Becker, Vischers Ferry, N. Y., assignor to General Electric Company, a corporation of New York Application February 10, 1950, Serial No. 143,549

1 Claim. (Cl. 308—9)

This invention relates to bearings and, in particular, to a novel sleeve bearing in which air is used as a lubricant.

A viscous lubricated sleeve bearing is one in which a viscous material such as grease, oil, air or gas is used to keep the bearing surfaces apart. The most common form of this type of bearing is the ordinary sleeve bearing using oil as a lubricating medium.

The load that can be carried by this type of bearing depends upon the viscosity of the lubricating material, which, in turn, depends upon the relative speed between the two bearing surfaces; thus, beeswax or ice is capable of carrying heavy loads at extremely low speeds, whereas kerosene or alcohol require high surface speeds to carry the same load.

The viscosity of air, for instance, is roughly only one-thousandth of that of light machine oil; thus, according to theoretical bearing design principles, an air bearing would require one thousand times the area of an oil bearing or a speed one thousand times faster to carry the same load.

Most oils give another form of protection known as boundary layer lubrication which is imparted to the metal surfaces and continues to keep them separated when the viscous separation breaks down from overload or heat. Actually, this boundary layer lubrication is a thin film of oil which adheres to highly polished surfaces and prevents seizing of a shaft in a bearing, even though the viscous layer of the oil has been squeezed out.

A sleeve bearing becomes an air bearing when it is so proportioned in size and speed that it will carry the required load in the presence of air or gas without the addition of oil. One of the great difficulties in this type of bearing is the lack of boundary layer protection which exists when oil is used as a lubricant. In an air bearing, when metal is run against metal with close clearances, an overload will cause the bearing to seize and score.

An air bearing, however, is sometimes very desirable, since it reduces the friction losses and drag caused by lubricating oils.

It is an object of this invention to provide a new and improved air bearing.

It is a further object of this invention to provide a new and improved air bearing which is inexpensive in construction.

Broadly, this invention comprises the combination of a stainless steel shaft in a graphitized carbon sleeve to form an air bearing.

Further objects and advantages of this invention will become apparent and the invention will be more clearly understood from the following description referring to the accompanying drawing, and the features of novelty which characterize this invention will be pointed out with particularity in the claim annexed to and forming a part of this specification.

Referring to the drawing, the single figure is a side view of a hermetically sealed motor provided with this new and improved air bearing.

In the drawing, a motor 1 having end shields 2 and 3 is provided with a stator 4 and a rotor 5 which is supported by bearings 6 contained in bearing housings 7 secured one to each of the end shields 2 and 3.

Rotor 5 is formed on a shaft 8 which is made of stainless steel. Stainless steel is meant as a generic term defining those particular types of steel described by manufacturers as being stainless. For example, a steel comprising .08–.15% carbon, 12–14% chromium, .2% manganese (maximum), 1% silicon, .18–.35% sulphur, 1.5% copper (maximum), .6% molybdenum or zircon, is considered in the art as stainless.

Each of the bearings 6, as used in this motor, is a graphitized carbon sleeve which is of a slightly larger internal diameter than the external diameter of shaft 8 to provide air space between shaft 8 and bearings 6. Bearings 6 are mounted in bearing housings 7 by any of the conventional methods. For example, a self-aligning bushing 9 may be used in each of the housings to assure an alignment between sleeve 6 and shaft 8. Bearing housings 7 are secured to each of the end shields 2 and 3 by any conventional method; for example, they can be welded to the end shields or integrally cast with them.

The combination of a stainless steel shaft and the graphitized carbon bearing is important, since this combination will provide an air bearing capable of sustaining overloads. Specifically, under overload conditions in a normal air bearing, the shaft tends to score the bearing surface. With this improved arrangement, however, at time of overload, this shaft comes in contact with the graphitized carbon bearing, which itself is a well-known lubricant. Consequently, neither the shaft or the bearing will be scored on overload.

It is important that the shear speed or relative surface speeds between bearing 6 and shaft 8 during normal operation (except when coming up to, or decreasing from, normal operating speed) be in excess of 1200 feet per minute and that the cylindrical bearing area load be approximately 6 sq. in. per lb. Conditions much below these figures come into the so-called graphite lubricated bearing where actual contact exists between the sleeve and the shaft. In a test of a bearing structure as described, a motor ran 500 hours at 21,000 R. P. M. in air and without any trace of oil.

It would involve no departure from this invention to employ a bearing such as that described in a motor hermetically sealed in a container or housing 10. An inert gas atmosphere could be provided as a motor cooling medium within the hermetically sealed container.

In tests that have been made on this type of bearing structure in a hermetically sealed container, it has been found that a relative humidity of more than 15% considerably prolongs the useful life of the bearings 6. For this reason, it has been found desirable to include water vapor in the inert gas within hermetically sealed container 10.

Further tests were made of a motor provided with this improved bearing running in a bell-jar. As the atmosphere was evacuated from the bell-jar, the friction losses within the bearing increased. This indicated that the improved bearing is actually an air bearing and not a modified form of a contact type graphite lubricated bearing.

Other tests were made using copper, brass, cold-rolled steel, and high carbon steels in combination with the graphitized carbon sleeve. None of these materials produced the highly desirable results shown by the stainless steel. Either an excessive amount of carbon built up on the shafts to increase the friction drag, or none would deposit on the shaft, in which case the bearing would chatter and grab.

Modifications of this invention will occur to those skilled in the art and it is desired to be understood, therefore, that this invention is not to be limited to the particular embodiment disclosed, but that the appended claim is meant to cover all the modifications which are within the spirit and scope of this invention.

What I claim as new and desire to secure by Letters Patent of the United States is:

In a support for a rotating element, a porous oil free graphitized carbon sleeve bearing, a stainless steel shaft rotating therein, a hermetically sealed casing surrounding said bearing support, and said casing containing an atmosphere of air with a relative humidity of not less than 15 per cent to which said bearing, shaft, and support are exposed to reduce bearing wear.

HOWARD I. BECKER.

REFERENCES CITED

The following references are of record in the file of this patent:

UNITED STATES PATENTS

| Number | Name | Date |
|---|---|---|
| Re. 16,126 | Schuler | July 28, 1925 |
| 1,453,083 | Schuler | Apr. 24, 1923 |
| 1,930,277 | Lenz | Oct. 10, 1933 |
| 1,980,081 | Ovington | Nov. 6, 1934 |
| 2,179,824 | Kip | Nov. 14, 1939 |
| 2,197,883 | Sinclair | Apr. 23, 1940 |
| 2,442,202 | Caley | May 25, 1948 |
| 2,562,595 | Blue | July 31, 1951 |